Dec. 13, 1932.  F. H. MUELLER  1,891,193

METER HANGER

Filed July 6, 1932

Frank H. Mueller

Inventor

Patented Dec. 13, 1932

1,891,193

UNITED STATES PATENT OFFICE

FRANK H. MUELLER, OF DECATUR, ILLINOIS, ASSIGNOR TO MUELLER CO., OF DECATUR, ILLINOIS, A CORPORATION OF ILLINOIS

METER HANGER

Application filed July 6, 1932. Serial No. 621,096.

My invention relates to meter hangers and particularly devices of the so-called rigid one-piece bar type.

An object of this invention is to provide a hanger construction consisting of few parts which may be shipped from the factory as a unit and which may be easily and quickly connected to a meter and to the service pipes by an unskilled workman.

Another object is the provision of a hanger which during assembly will permit slight lateral adjustment of the service pipes relative to the hanger such as is required where the pipes are out of alignment with the spuds on the meter.

A further object is to eliminate the so-called sleeve connections which are well known in the art, and which require that a very nice fit be obtained between the sleeve and the opening in the bar, and hence the severe strains to which a hanger is subjected cannot be absorbed and very frequently result in breakage of the threaded ends of the service pipes with incidental leakage. These sleeve constructions are satisfactory, but, in any case where the pipes are out of alignment they present a very important difficulty.

In the present invention I provide the opening in the bar with a beveled seat, and a connector adapted to be received within the opening and having a beveled head portion engageable with the seat and cooperating therewith to form a joint which will permit limited lateral movement between the connector and bar whereby any misalignment of the service pipes may be compensated for.

Further objects and advantages will become apparent as the description proceeds.

Figure 1:
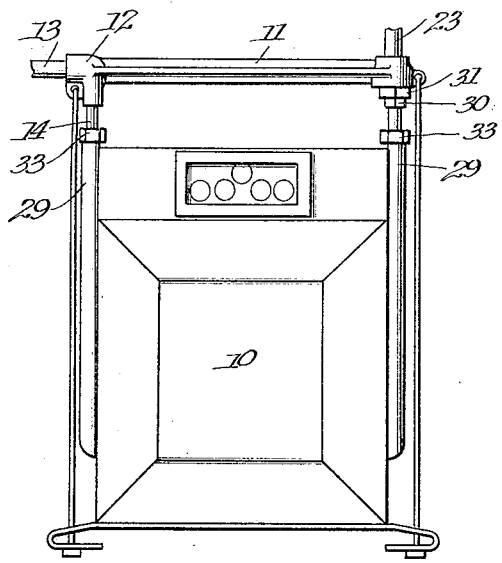
Figure 1 is a front elevation.

Referring to the drawing, the numeral 10 designates a meter and the numeral 11 the bar of my improved construction which in the preferred form comprises a rigid bar, but which may be made of separate extensibly connected pieces as desired.

Figure 2:
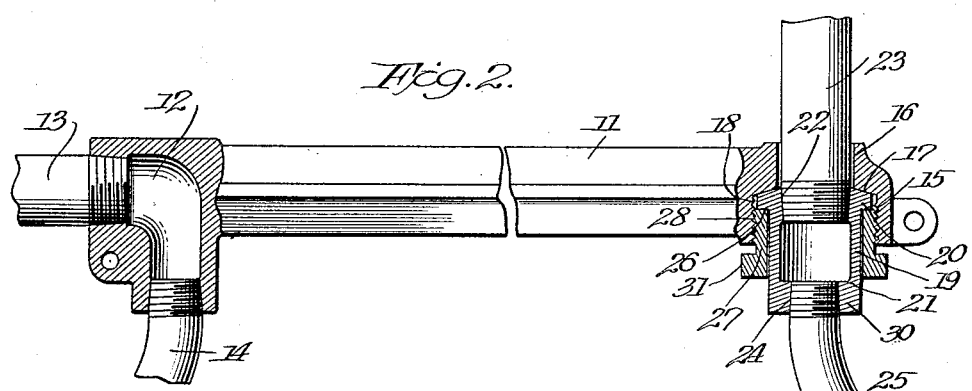
Figure 2 is a front elevation of the hanger with the connection at one end in section.

At one end of the bar in Figure 2 is the usual opening 12 which extends through the bar. The supply or service pipe 13 is threaded into the adjacent end of the opening 12, and the nipple 14, which leads to the meter is threadedly connected in the other end of the opening. In this manner communication is established to the meter on one side thereof.

The other end of the bar 11 is provided with a transverse opening 15 which is reduced in diameter adjacent its upper extremity to form a restricted portion 16. A tapered or beveled seat 17 defines the lower end of the restricted portion 16 and the wall of the enlarged portion of the opening is preferably internally screw threaded as shown at 18. The numeral 19 indicates a hollow connector which is formed with an enlarged or flanged portion or head 20 and a reduced portion 21. The enlarged portion of the connector is preferably internally threaded as at 22 for connection to a service pipe 23 and the reduced portion is likewise internally threaded at 24 to receive the offset coupling nipple 25 similar to the nipple 14.

The enlarged portion 20 of the connector defines at one end a shoulder 26 and the extreme end of this enlarged portion is beveled to substantially correspond to the bevel of the seat 17 and is adapted to abut the same when the several parts are assembled. A coupling nut 27 surrounds the connector and engages the shoulder 26, the nut being externally threaded at 28 to engage the threads 18 of the opening 15.

The several parts are so formed that in assembled position, the restricted portion 16 of the opening will loosely receive the pipe 23 and the coupling nut 27 will loosely surround the restricted portion of the connector. Likewise there will be sufficient clearance between the enlarged head 20 of the connector and the opening 15, to permit a slight amount of play and take care of any lack of alignment of the pipes in assembling the hanger.

The hanger, as shipped from the factory, will consist of the bar 11 having the connection 12 at one end, and the connector and coupling nut associated with its opposite end. In some cases it may be desirable to initially connect the coupling nipples to the bar and market it in this manner.

In assembling the device, the coupling nut 27 is first unscrewed from the opening 15 to release the connector 19; the service pipe 23 is passed through the opening in the bar and the connector is then threaded upon the service pipe. When this connection is established i. e. a sealed joint, the arrangement is such that the end of the pipe 23 projects into the upper end of the opening 15 and thus the bar 11 is supported by the connector 19 and pipe 23, with the seat 17 abutting the beveled portion of the connector. By threading the coupling nut 27 within the opening 15, as shown, the connector and bar are clamped together, and due to the clearance between the several parts, a centering of the service pipe and nipple is effected, which is of great importance where they are out of alignment. It will be apparent that this centering action will be greatly facilitated because of the beveled faces of the seat in the opening 15 and connector head which permits tilting of the pipes and connector in the opening. With the present invention, should the service pipes be out of alignment nevertheless by reason of the centering obtained, there will be no strain upon any of the parts or upon the bar or pipe but on the contrary, strain will be distributed.

Figure 3:
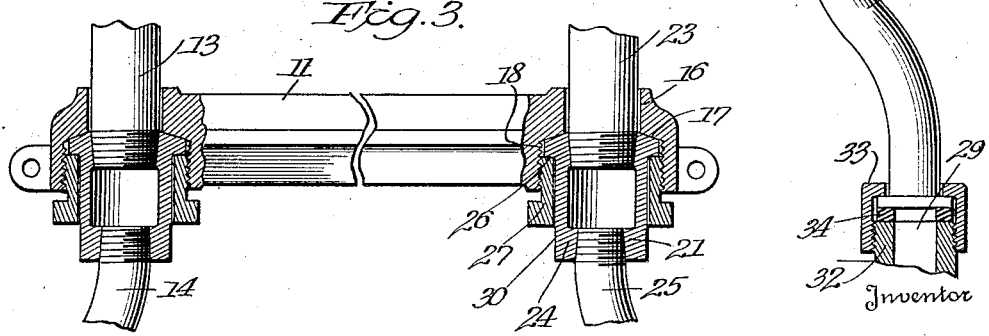
Figure 3 is a front elevation of the hanger in which connections such as shown in Figure 2 are provided at both ends of the bar.

In Figure 3 of the drawing, I have illustrated a construction, wherein the connector and coupling nut are utilized at both ends of the bar to accomplish communication with the meter. In this adaptation the tilting and centering of the pipe with respect to the bar which is provided for by the invention, is of equal importance.

As in the form shown in Figures 1 and 2, when the connector and coupling nut have been assembled in connected relation with the bar, the coupling nipples 25 and 14 may be threaded upon the lower end of the connectors. These coupling nipples are usually malleable iron pipes and have their lower ends offset with respect to the bar, whereby they are connected up with the meter tubes 29 in the desired manner.

The present invention avoids the use of any sleeved connections, and no expensive machining is necessary to provide a nice fit, but, on the contrary, the invention requires but two (2) parts, namely, the connector and coupling nut, which may be produced at relatively small expense, and, it will be noted, enable the installation to be made with a minimum of effort.

It is also to be noted that the coupling nut, in addition to securing the connector to the bar, also has the function of guiding the connector in normal position, in that the interior wall of the nut is spaced from the exterior wall of the connector a proper distance to permit this as well as tilting of the connector. Preferably, the reduced portion of the connector will be provided with a polygonal exterior 30 to receive a wrench for threading the connector onto the service pipes. Likewise, the enlarged portion of the coupling nut will have a polygonal exterior 31 for the same purpose.

In Figures 2 and 3 I have shown the supply pipe 23 as extending into the opening 15 and the connector and coupling nut extending below the bottom of the bar. This construction may however, be reversed, with the restricted portion 16 and the seat 17 being positioned at the lower end of the opening and the connector 19 and coupling nut 27 projecting from the top of the bar. Either of the constructions may be employed with equal facility although the invention as set forth in Figures 1 and 2 is the preferred form.

As shown in Figure 2, the meter spud 32 is connected to the offset nipple 25 by means of a union coupling comprising a nut 33 and a flexible washer 34. The provision of this washer permits a fluid tight joint to be made at the meter even though there be a slight angle between the end of the coupling and the meter spud.

The flexible washer 34 is made of compressible material so that in the center of the connector, should there be a slight angle between the nipple and the meter spud, the resiliency of the washer or packing will compensate for such condition and maintain a sealed joint.

It is to be observed in the present construction that the pipe is efficiently protected by the meter bar, the connector and the nut and as distinguished from the conventional sleeve constructions, strain or wear is distributed and absorbed by the several parts so that none is subjected to any considerable stress. That is to say, in the sleeve structures where the service pipe is connected to the upper end of the sleeve, a terrific strain is imposed upon the pipe and its threaded connection with the sleeve which results in cracking of the pipe and destruction of the threads whereby the seal between the pipe and sleeve is destroyed. Such an objectionable contingency in the present invention is clearly avoided.

I claim:

1. Means for spacing the service pipes of meters, comprising a bar having at one end thereof means for establishing communication with the meter and at the other end thereof an opening, the wall of said opening being formed with a seat portion intermediate its ends, said opening being adapted to receive a service pipe, a connector associated with the pipe and with a second pipe for establishing communication with the meter and provided with a portion adapted to engage said seat, and means for securing the connector to the bar.

2. Means for spacing the service pipes of meters, comprising a bar having at one end thereof means for establishing communication with the meter and at the other end thereof an opening, said opening being formed with a beveled seat portion intermediate its ends, said opening being adapted to receive a service pipe, a connector associated with the pipe and with a second pipe for establishing communication with the meter and provided with a beveled portion adapted to engage said beveled seat, and means for securing the connector to the bar.

3. Means for spacing the service pipes of meters, comprising a bar having at one end thereof means for establishing communication with the meter and at the other end thereof an opening, a seat intermediate of the opening, said opening being adapted to receive a service pipe, a connector associated with the pipe and with a second pipe for establishing communication with the meter and provided with a portion adapted to engage said seat, and a coupling nut engaging the connector and threaded in said opening.

4. Means for spacing the service pipes of meters, comprising a bar having at one end thereof means for establishing communication with the meter and at the other end thereof an opening, a seat formed on the wall of the opening, said opening being adapted to receive a service pipe, a connector associated with the pipe and with a second pipe for establishing communication with the meter and provided with an enlarged head forming an intermediate shoulder, and a coupling nut engaging the shoulder of the connector and adapted to clamp the head against said seat.

5. Means for spacing the service pipes of meters, comprising a bar having at one end thereof means for establishing communication with the meter and at the other end thereof an opening, a beveled seat in the wall of said opening, said opening being adapted to receive a service pipe, a connector associated with the pipe and with a second pipe for establishing communication with the meter and provided with an enlarged head defining an intermediate shoulder, the end of said head being beveled and adapted to engage said beveled seat, and a coupling nut engaging the shoulder of the connector and threaded in said opening.

6. Means for spacing the service pipes of meters, comprising a bar having at one end thereof means for establishing communication with the meter and at the other end thereof an opening and a seat adjacent one end thereof, said opening being adapted to receive a service pipe, a connector associated with the pipe and with a second pipe for establishing communication with the meter and adapted to be positioned substantially within said opening with one end thereof abutting said seat, and a coupling nut for maintaining said connector in engagement with said seat.

7. A meter hanger comprising a bar having an opening, a pipe telescoping within said opening, a connector telescoping within said opening and secured to said pipe, and a coupling nut telescoping within said opening and surrounding said connector.

8. In a meter hanger, a one piece bar having an opening, the wall of said opening being reduced to form an internal shoulder, a connector, and means engageable with said bar and said connector to hold said connector against said shoulder.

In testimony whereof I affix my signature.
FRANK H. MUELLER.